United States Patent [19]

Eaglesham

[11] Patent Number: 4,987,631
[45] Date of Patent: Jan. 29, 1991

[54] CLEANING ATTACHMENT

[75] Inventor: Wallace C. S. Eaglesham, Rockhampton, Australia

[73] Assignee: Daxrose Pty. Ltd., Queensland, Australia

[21] Appl. No.: 375,891

[22] Filed: Jul. 5, 1989

[51] Int. Cl.$^5$ .................. B60S 3/04; A46B 11/02; A47L 11/38
[52] U.S. Cl. ................................. 15/21.1; 15/53.1; 15/DIG. 2; 15/50.1
[58] Field of Search .................. 15/21 R, 21 E, 50 R, 15/50 C, 49 R, 49 RB, 49 C, 53 R, 53 A, DIG. 2, 98, 56

[56] References Cited

U.S. PATENT DOCUMENTS 2,636,198  4/1953  Wilson .............................. 15/53 A
2,876,472  3/1959  Rousseau .......................... 15/53 A

FOREIGN PATENT DOCUMENTS 1352066  5/1974  United Kingdom ............... 15/49 C Primary Examiner—Edward L. Roberts
Attorney, Agent, or Firm—Marshall, O'Toole, Gerstein, Murray & Bicknell

[57] ABSTRACT

A cleaning attachment to fit a forklift truck for cleaning substantially vertical surfaces. The attachment includes a mounting frame fitted with spaced apart hollow sleeves to receive the forks of the forklift truck and thereby connect the frame with the hydraulic hoist for vertical movement. An elongate scrubbing element is mounted with a support frame connected with the mounting frame by spaced apart parallel arms. The arms are pivotally mounted with the mounting frame and support frame respectively to provide reciprocating movement of the scrubbing element toward and away from the surface to be cleaned. In use the scrubbing element is traversed over the surface to be cleaned by vertical movement of the hoist and horizontal movement of the forklift.

10 Claims, 3 Drawing Sheets

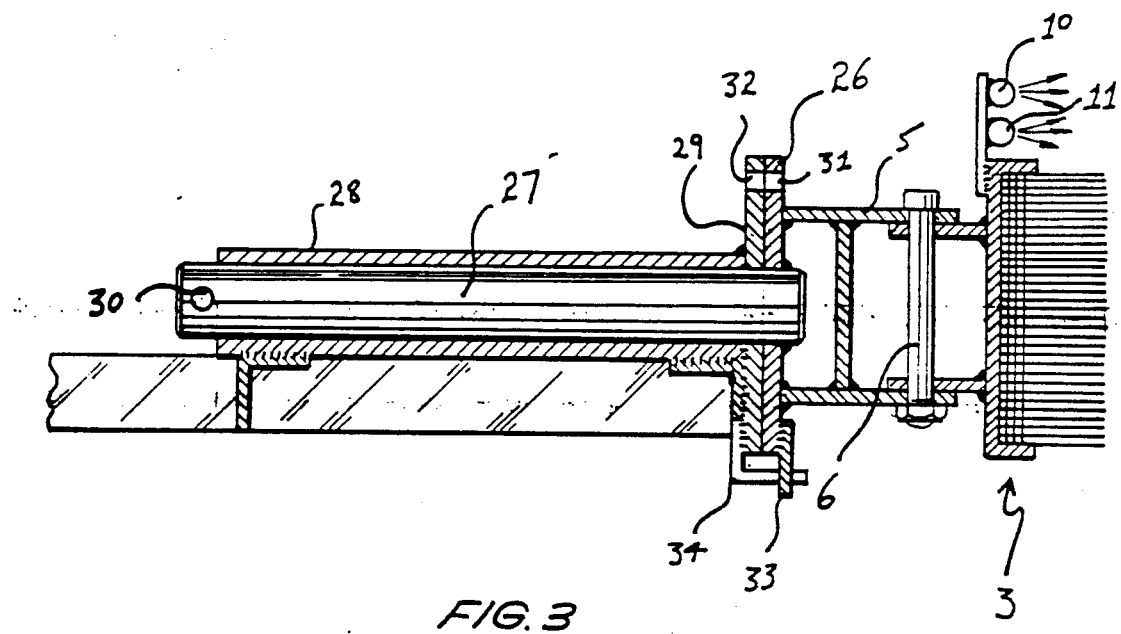

4,987,631

CLEANING ATTACHMENT

BACKGROUND OF THE INVENTION

1. Field of the Invention

This invention relates to a cleaning attachment to fit a forklift truck for cleaning generally vertical surfaces for example the sides of pantechnicon trucks, shipping containers, and the sides of buildings. Although the invention is hereinafter described with reference to its application to the cleaning of pantechnicon trucks it is not limited to this application.

2. Description of the Prior Art

Hitherto pantechnicons or enclosed freight trailers have been washed manually using brooms and hand held hoses. This operation requires several man hours to complete which is disadvantageous in terms of cost and the time that the vehicle cannot be used.

SUMMARY OF THE INVENTION

It is an object of this invention to provide a cleaning attachment to fit a forklift truck for cleaning substantially vertical surfaces.

According to the invention there is provided a cleaning attachment to fit a forklift truck for cleaning substantially vertical surfaces, said attachment comprising a mounting frame adapted for connection with the hydraulic hoist of said forklift for vertical movement, a support frame, an elongate scrubbing element mounted with the support frame, said two frames being interconnected by spaced apart substantially parallel arms pivotally mounted with the support frame and mounting frame respectively to provide reciprocating movement of the scrubbing element toward and away from the surface to be cleaned, whereby the scrubbing element can be traversed over the surface to be cleaned by vertical movement of the hoist and horizontal movement of the forklift.

Preferably the two frames are interconnected by four spaced apart substantially parallel arms of equal length, and the reciprocating movement is in a substantially horizontal plane.

Preferably also the scrubbing element is mounted with a distal end of the support frame and means are provided to bias the support frame toward the surface to be cleaned.

In the preferred embodiment the mounting frame includes a pair of hollow sleeves spaced apart and shaped to receive the forks of the forklift truck.

An elongate spray bar is preferably supported adjacent the scrubbing element to, in use, direct a flow of cleaning liquid onto the surface to be cleaned.

An embodiment of the invention will now be described, by way of example only, with reference to the accompanying drawings.

BRIEF DESCRIPTION OF THE DRAWINGS

FIG. 3 is an enlarged sectional elevation of a modification to the cleaning attachment shown in FIGS. 1 and 2.

DESCRIPTION OF THE PREFERRED EMBODIMENTS

Figure 1:
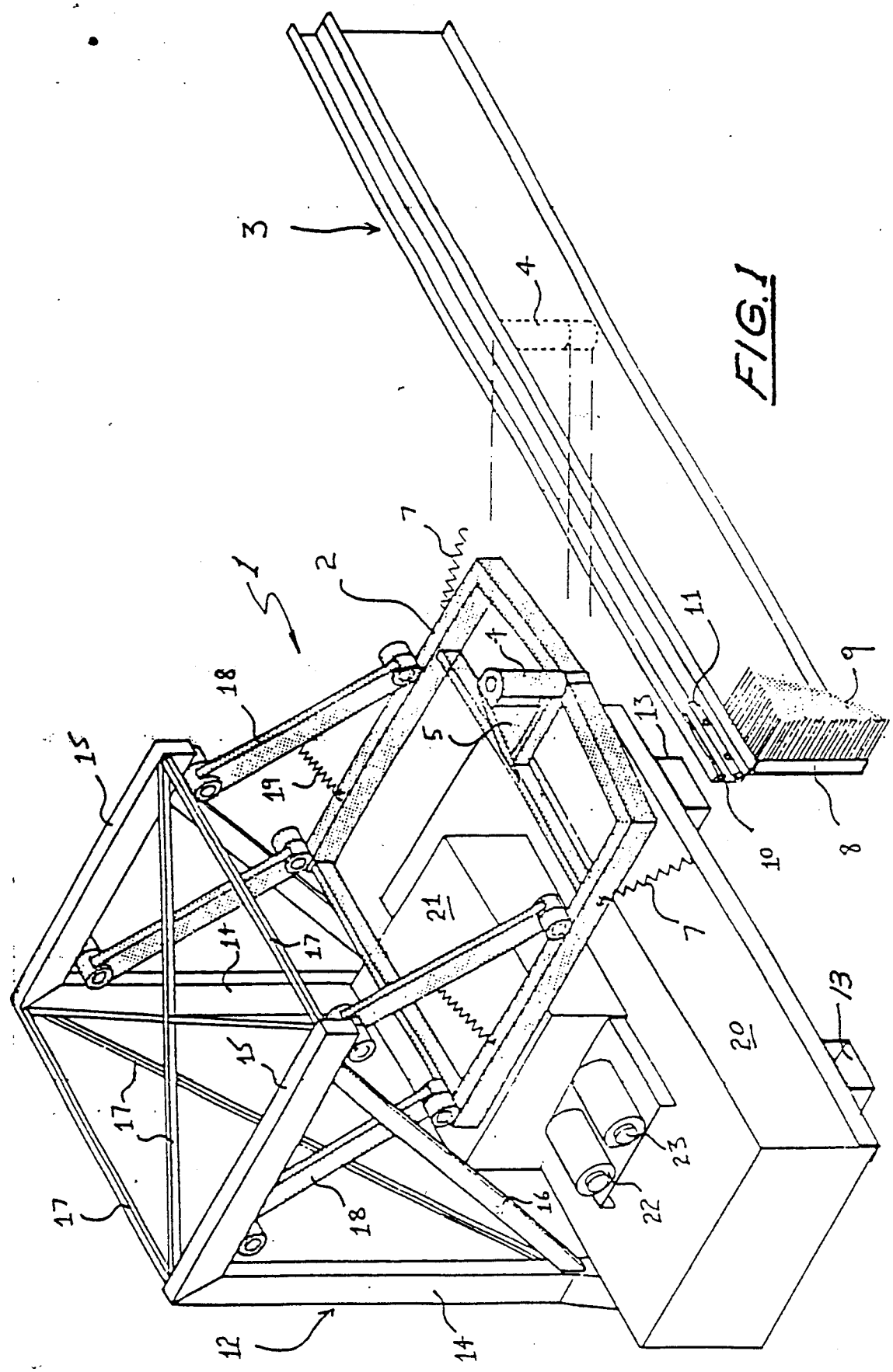
FIG. 1 is a schematic perspective view of a cleaning attachment of a preferred embodiment.
Figure 2:
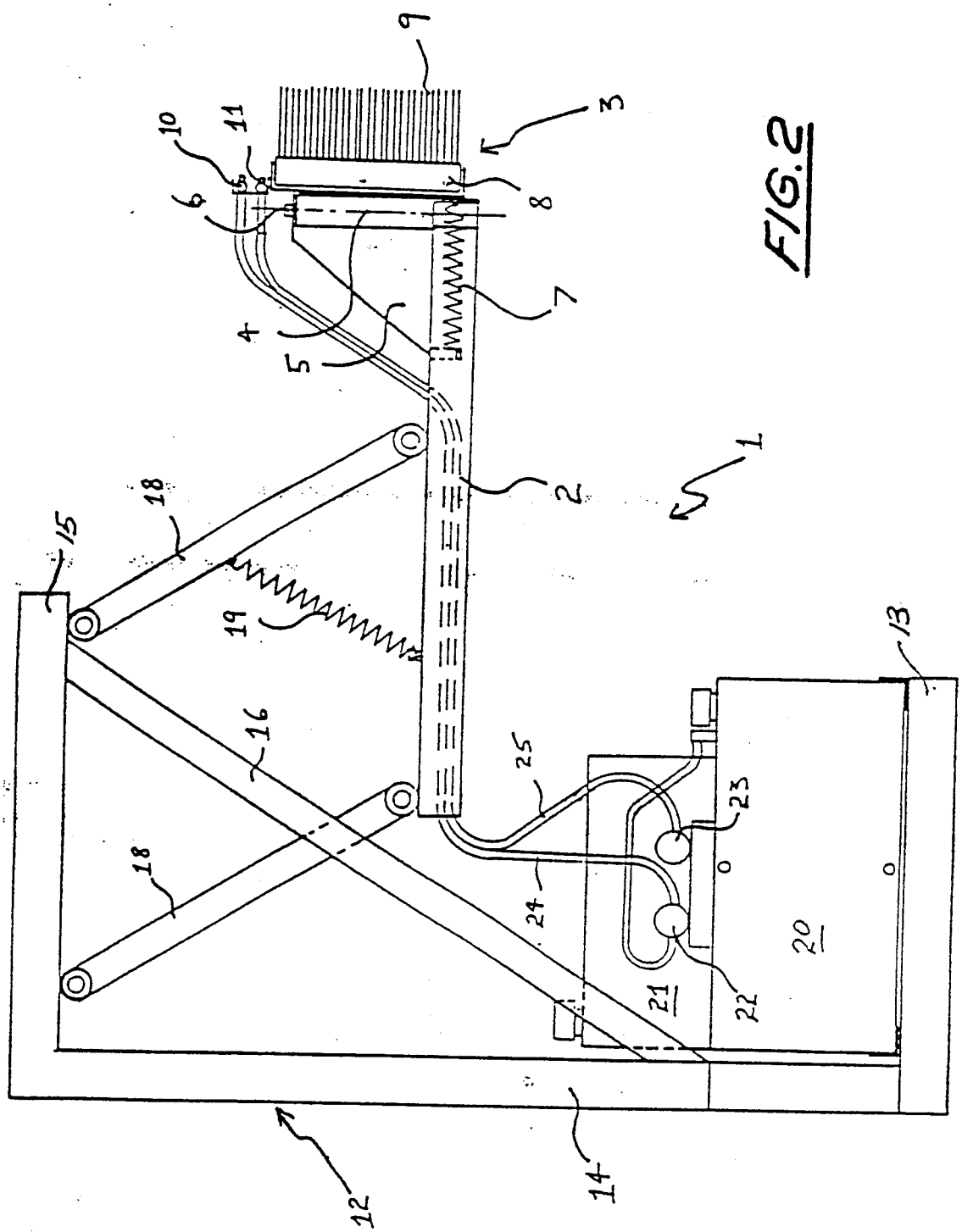
FIG. 2 is a side view of the attachment shown in FIG. 1.

Referring to FIGS. 1 and 2 cleaning attachment 1 comprises a support frame 2 with which an elongate scrubbing element 3 is pivotally mounted approximately midway along its length. The frame 2 can be formed from any suitable material such as extruded aluminium sections and the pivotal mounting is formed by a tubular section 4 which is secured to scrubbing element 3, a bracket arrangement 5, and a pin 6 which passes through apertures in the bracket arrangement and through the tubular section 4. Extension springs 7 extend between the frame 2 and scrubbing element 3 on either side of the pivotal mounting to bias the scrubbing element toward a position generally transverse to the support frame 3. The scrubbing element 3 comprises a backing 8 from which bristles 9 extend so as to form a brush. Alternatively, a section of medium density foam rubber or similar material over which a mesh sleeve (not shown) is fitted to protect the foam can be used. Two spray bars 10 and 11 are mounted above the scrubbing element 3 and extend along the length thereof. These spray bars are used to apply a detergent on the one hand and clean water on the other to the surface to be cleaned as will be described below.

A mounting frame 12 includes a pair of parallel spaced apart hollow sleeves 13 arranged and internally shaped to slideably receive the forks of a forklift truck (not shown). It will be apparent that the sleeves 13 provide a connection with the hoist hydraulics of the forklift which allows vertical movement of the mounting frame 12. The mounting frame has two sides each formed by a generally vertical section 14 and a generally horizontal section 15. A strengthening gusset 16 is welded or otherwise fixed between the portions 14 and 15. At each side of the frame 12 is interconnected by transverse and diagonally extending struts 17.

Support frame 2 is mounted with the horizontal portion 15 of the mounting frame by means of four parallel arms 18 arranged in pairs to respectively interconnect one side of the mounting frame 12 and the support frame 2. The ends of arms 18 are pivotally mounted to the horizontal portion 15 and frame 2 respectively using conventional bush and pin arrangements. The four arms 18 are substantially of equal length and the pivotal connections are equally spaced so as to provide a parallelogram arrangement which ensures that the support frame 2 is able to move in a reciprocating manner in a plane substantially parallel to the horizontal portion 15. Springs 19 are provided between arms 18 and the support frame 2 to bias the support frame toward the outward extent of its travel.

A water tank 20 and a detergent tank 21 are mounted atop the sleeves 13. Electric pumps 22 and 23 respectively supply water and detergent via hoses 24 and 25 to spray bars 10 and 11. The electric pumps are actuated by a solenoid control (not shown) in response to a switch (not shown) operated by the driver of the forklift.

In use the cleaning attachment is mounted with a forklift (not shown) by engagement of the forks with sleeves 13. The forklift is driven up to the surface to be cleaned, such as the side of a truck, and once the scrubbing element 3 contacts the surface forklift is driven forward to move the support frame from its furthermost outward position toward which it is biased by springs ly midway along its travel.

In this way a gentle pressure is applied by the scrubbing element 3 to the side of the truck by the operation of springs 19. The scrubbing element is then traversed vertically by operation of the forklift hydraulics and the reciprocating movement of the support frame 2 is able to allow for any slight variations in the distance between the cleaning attachment and the surface to be cleaned. During this operation the spray bars are used to direct a supply of cleaning fluid and rinsing water onto the surface.

One particularly beneficial method in which the apparatus can be used is to make a first vertical stroke up the surface whilst applying detergent. Subsequent downward and upward strokes are made to clean the surface. The forklift is then backed away from the surface until the scrubbing element is say six inches from the surface and rinsing water applied as the scrubbing element is moved downwardly.

To clean the next section of the surface the forklift is moved horizontally by suitable manoeuvring and the process repeated.

The present arrangement has been found to be very efficient and is particularly suited for use in so called curtain sided vehicles in which the vertical walls of the vehicle are formed by curtains made from canvas or other similar material. The present arrangement has been found to be able to easily cope with any irregularities in the surface to be cleaned.

FIG. 3 shows a modification which allows scrubbing element 3 to be disposed in a vertical position particularly suitable for transporting the cleaning attachment. In FIG. 3 the same reference numerals have been used where appropriate to identify similar parts.

In accordance with the modification bracket arrangement 5 is welded to a flat circular plate 26. Plate 26 is welded concentrically to a mounting axle 27 which fits into a tubular bearing 28 in turn welded to frame 2. A second flat circular plate 29 is welded to bearing 28 for face to face abutment with plate 26. A pin 30 passes through the distal end of axle 27 to prevent the axle from being withdrawn from the bearing 28. This modification thus allows rotation of the scrubbing element to a vertically extending position (not shown) which is preferable for transport from one job to another. Apertures 31, 32 in plates 26 and 29 are provided and disposed so as to be aligned when the scrubbing element 3 is in the horizontal or normal working position. This allows a pin (not shown) to be passed through the aligned apertures 31, 32 to lock the scrubbing element in the horizontal position shown. Lugs 33 and 34 are respectively provided on plates 26 and 29 and disposed to define the limits of rotation of the scrubbing element. This is usually restricted to 90° of movement.

Although not illustrated it is strongly preferred that the cleaning attachment includes a height adjustment mechanism. Such a mechanism is fitted to vertical portion 14 of the mounting frame so that the vertical distance between the sleeves 13 and the scrubbing element 3 can be readily adjusted. In this way the device is able to be adjusted for use in cleaning vertical surface extending between a greater range of heights. This is particularly useful in for example changing from the cleaning of buses to the cleaning of pantechnicon semi-trailers. The height adjusting arrangement can comprise any suitable know arrangement such as telescopically arranged uprights moved by hydraulic rams or the like.

The foregoing describes only one embodiment of the invention and modifications may be made thereto without departing from the scope of the invention.

What is claimed is:

1. A cleaning attachment to fit a forklift truck for cleaning substantially vertical surfaces, said attachment comprising a mounting frame adapted for connection with the hydraulic hoist of said forklift for vertical movement, a support frame, an elongate scrubbing element mounted with the support frame, said two frames being interconnected by spaced apart substantially parallel arms pivotally mounted with the support frame and mounting frame respectively to allow reciprocating movement of the support frame and scrubbing element toward and away from the surface to be cleaned, whereby the scrubbing element can be traversed over the surface to be cleaned by vertical movement of the hoist and horizontal movement of the forklift.

2. A cleaning attachment according to claim 1 wherein said two frames are interconnected by four spaced apart substantially parallel arms of substantially equal length.

3. A cleaning attachment according to claim 1 or claim 2 wherein said support frame is substantially horizontal and remains substantially horizontal during the reciprocating movement.

4. A cleaning attachment according to claim 1 wherein the scrubbing element is mounted to a distal end of the support frame and including bias means to bias the support frame toward the surface to be cleaned.

5. A cleaning attachment according to claim 4 wherein the bias means is operatively associated with the support frame and at least one of said arms to effect said bias of the support frame toward the surface to be cleaned.

6. A cleaning attachment according to claim 1 wherein the scrubbing element is mounted to the support frame by a pivotal connection approximately midway along the element to permit limited rotation of the scrubbing element in a substantially horizontal plane.

7. A cleaning attachment according to claim 1 including biasing means operatively associated with the support frame and the scrubbing element to bias the scrubbing element toward a position generally transverse to the direction of reciprocating movement of the support frame.

8. A cleaning attachment according to claim 1 wherein the mounting frame includes a pair of hollow sleeves spaced apart and shaped to receive the forks of the forklift truck.

9. A cleaning attachment according to claim 1 wherein an elongate spray bar is supported adjacent the scrubbing element to, in use, direct a flow of cleaning liquid onto the surface to be cleaned.

10. A cleaning attachment according to claim 1 wherein said elongate scrubbing element is mounted for rotation with respect to said support frame about an axis substantially parallel to said reciprocating movement.

* * * * *